United States Patent [19]
Jacobson

[11] Patent Number: 5,317,511
[45] Date of Patent: May 31, 1994

[54] METHOD OF FINDING DEFINITIONS IN COMPUTER SOURCE PROGRAMS

[76] Inventor: Harvard R. Jacobson, 4221 Hemlock La., Plymouth, Minn. 55441

[21] Appl. No.: 21,737

[22] Filed: Feb. 23, 1993

Related U.S. Application Data

[63] Continuation of Ser. No. 424,861, Oct. 20, 1989, abandoned.

[51] Int. Cl.$^5$ .............................. G06F 15/40
[52] U.S. Cl. ................... 364/419; 364/419.17; 395/156
[58] Field of Search .............. 364/419, 400, 401; 395/606, 155, 156, 145, 146

[56] References Cited

U.S. PATENT DOCUMENTS 4,953,080  8/1990  Dysart et al. ............... 364/200
4,982,344  1/1991  Jordan ........................ 364/521

OTHER PUBLICATIONS

"A grand Vision" Fiderio Byte Margarine Oct. 1988.
Microsoft Windows User Guide, Version 2 1987, pp. Chp. 2; #15 and Chp. 3; #33 and #35.
Lattice Incorporated; Lattice Screen Editor; Reference Manual; Version 2.0; pp. 33 & 37.
Computer Data Systems, Inc.; Scan Cobol, Sales Brochure.
Power Software, Inc.; Tree Diagrammer, Sales Brochure.
Clear Software, Inc.; Clear Sales Brochure.
Software Blacksmiths Inc.; C-DOC Sales Brochure, May 1989.
Micro Focus Inc., Micro Focus Work Bench; Version 2.3; Product Data Sheet, Sep. 1989.

*Primary Examiner*—Roy N. Envall, Jr.
*Assistant Examiner*—Andrew Bodendorf
*Attorney, Agent, or Firm*—Merchant, Gould, Smith, Edell, Welter & Schmidt

[57] ABSTRACT

A computer program is described which makes it easier for a computer programmer to view and understand the source code of other programs. The user can look up the definition of, or references to, a name without typing the name. After the name has been looked up, the user can return automatically to his original location in the text. Multiple return locations are saved. The invention incorporates knowledge of the syntax of the programming language and creates an internal cross-reference. As a result, lookups are rapid and accurate.

2 Claims, 13 Drawing Sheets

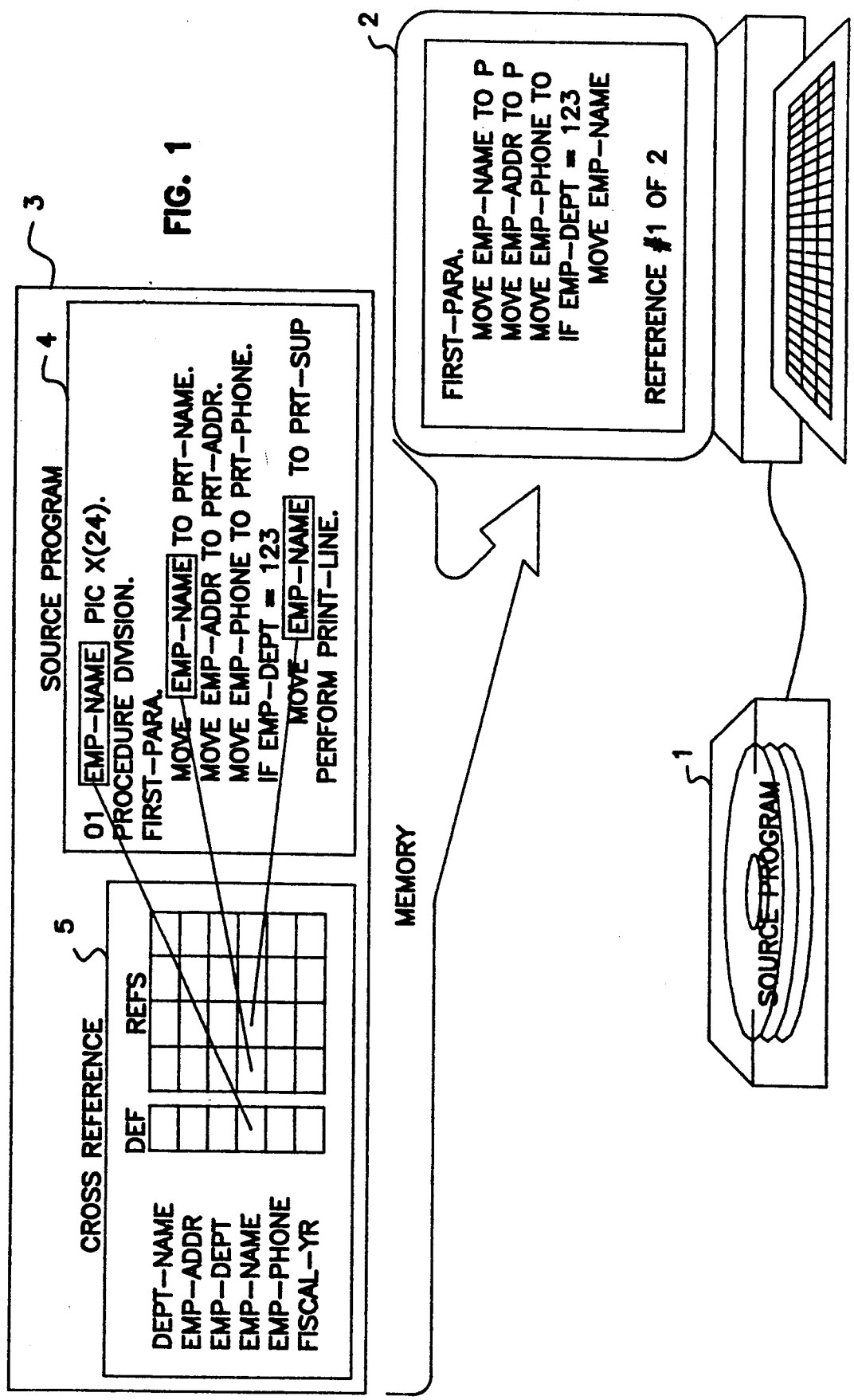

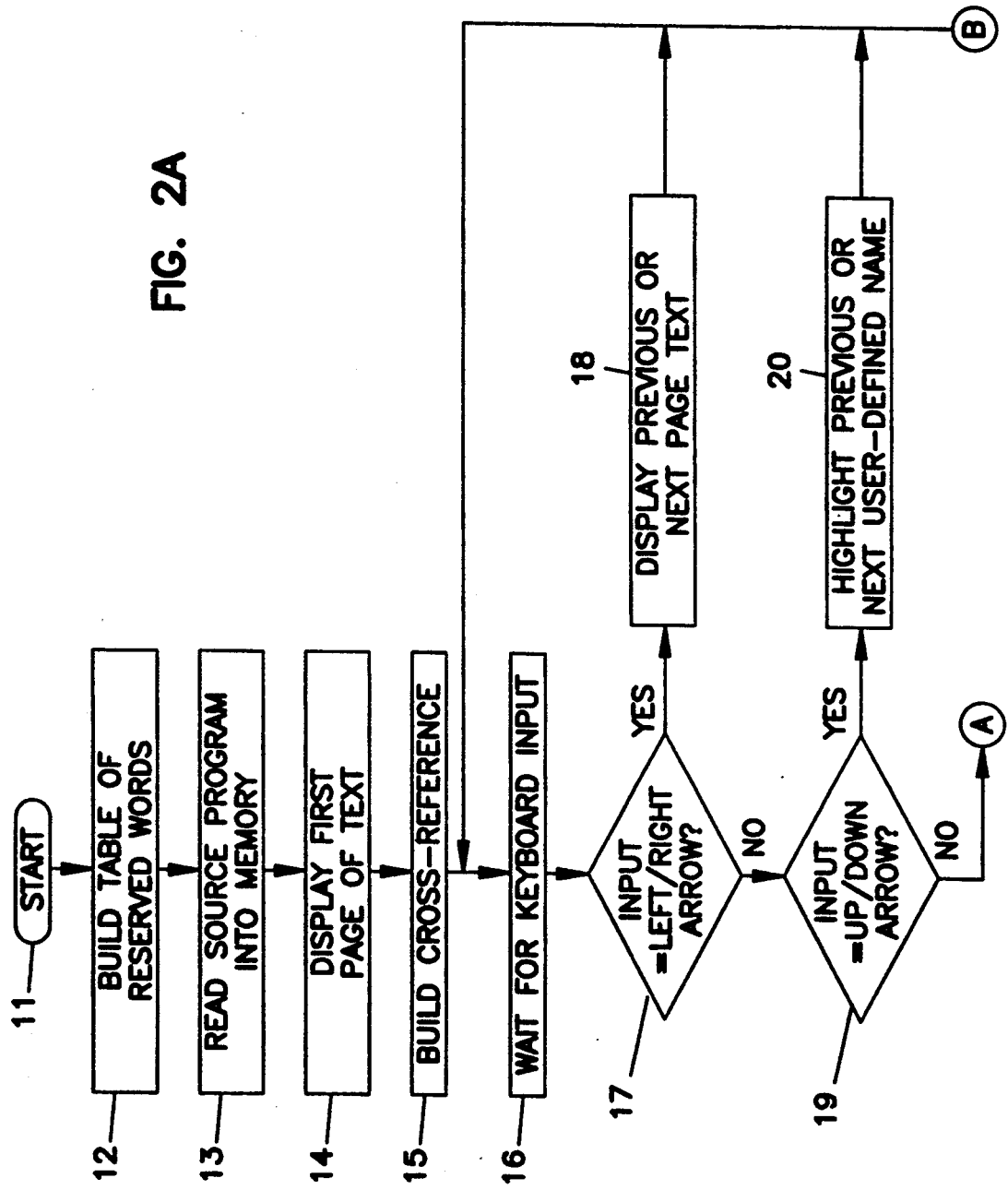

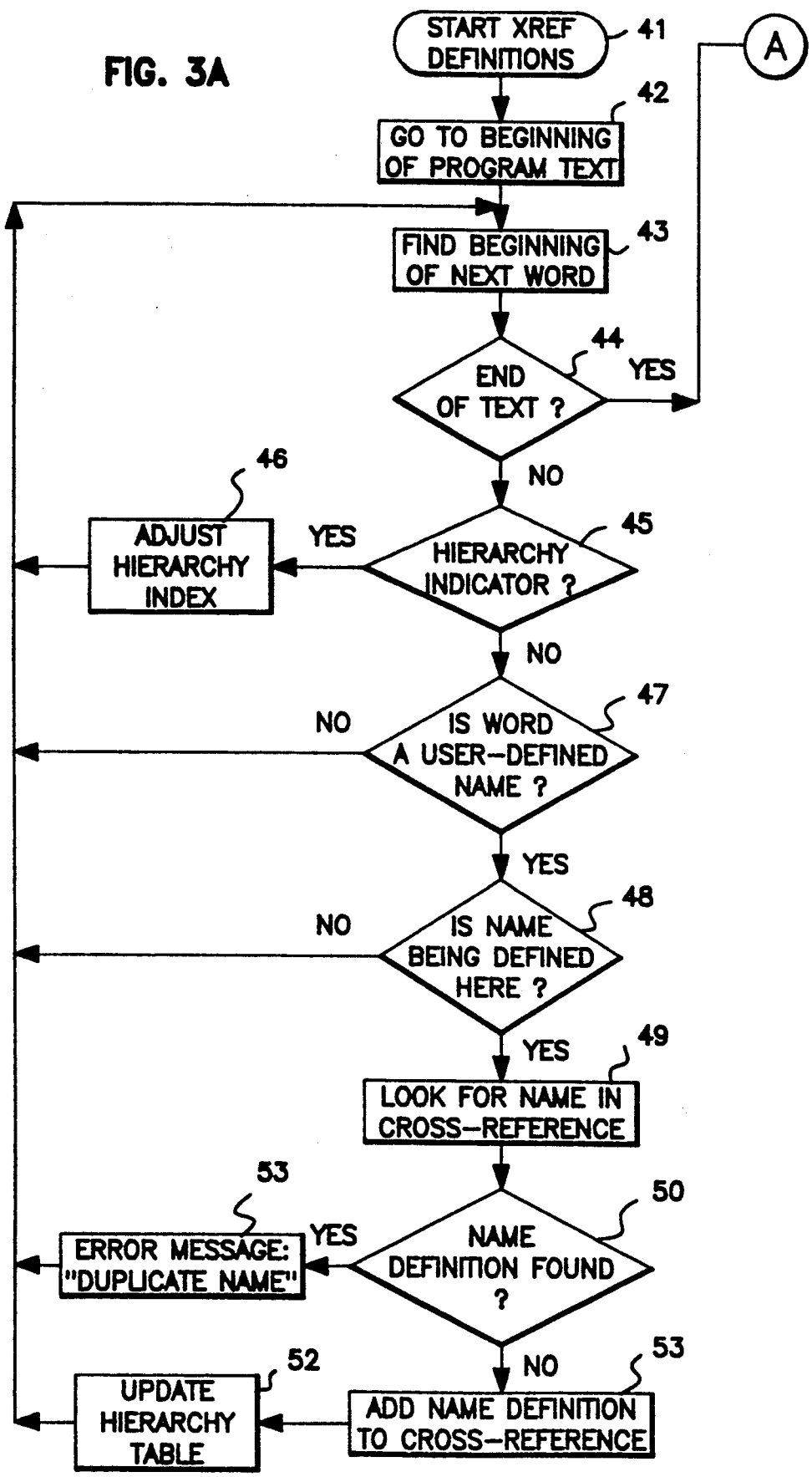

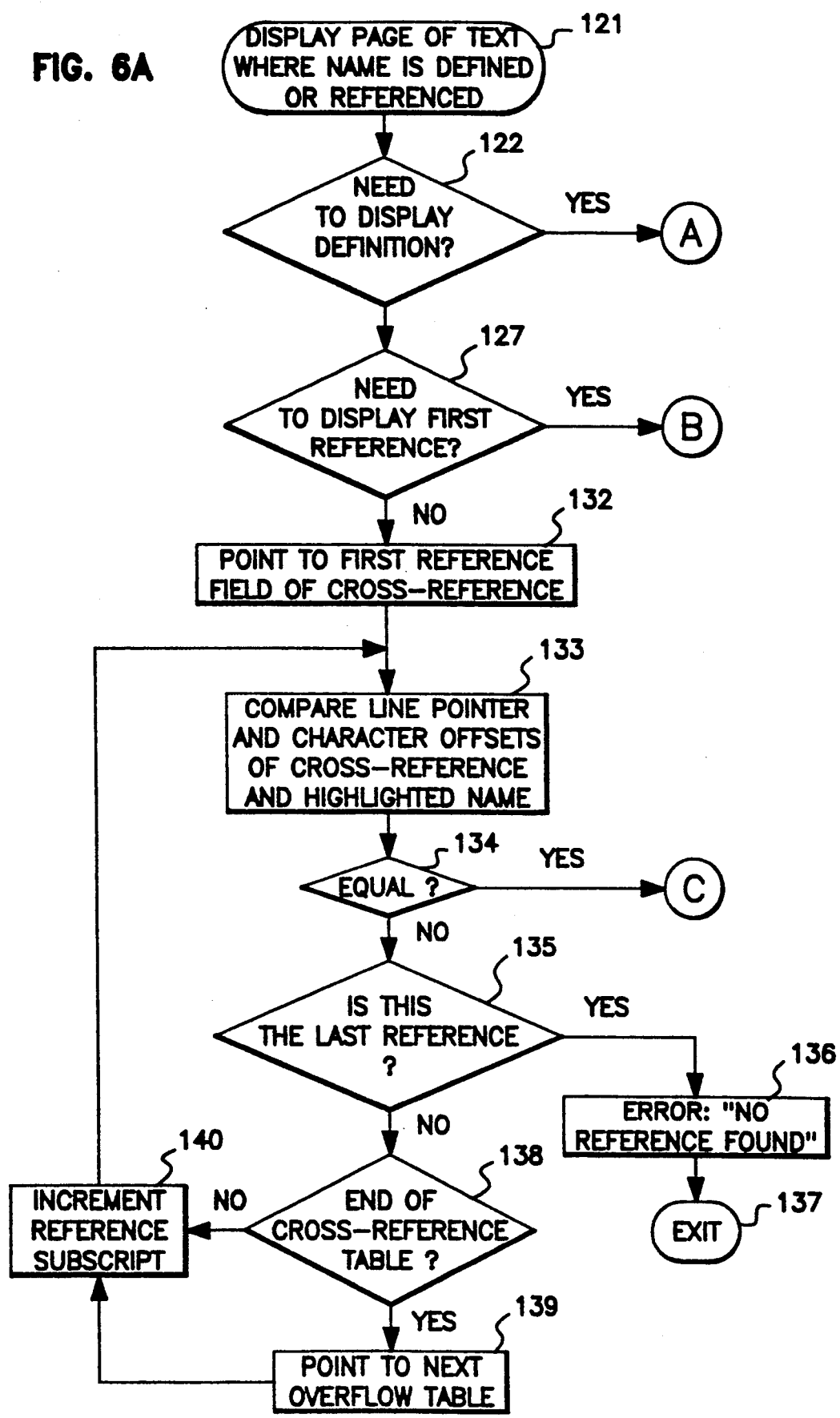

METHOD OF FINDING DEFINITIONS IN COMPUTER SOURCE PROGRAMS

This is a continuation of application Ser. No. 07/424,861, filed Oct. 20, 1989, which was abandoned upon the filing hereof.

BACKGROUND OF THE INVENTION

1. Field of the Invention

This invention relates in general to computer/user interfaces, and in particular to a computer program which assists the user in understanding computer source code.

2. Description of Related Art

Computer programmers spend a great deal of time studying the source code of existing programs. They must do this in order to correct problems, make improvements, prepare estimates, and answer questions. In addition, while writing a program, the programmer spends a great deal of time studying the code that has already been written.

In most programming languages, the programmer is free to invent names for data and procedures, as long as these names do not conflict with reserved words whose meaning is fixed by the language. Usually a name is defined in one place and may be referenced in any number of places.

Computer programs are usually difficult to understand. One of the reasons for this is that, in order to understand the program, the programmer must frequently look up the definition of, or references to, a name. Often this means searching through thousands of lines of code.

Currently, two devices exist which help the user look up information: cross-references and text editors.

A cross-reference is a printed, alphabetized list of all the names that the programmer has defined. Next to the name is printed the line numbers where the name is defined and referenced. In a variation on the cross-reference idea, some products embed cross-reference information within a listing of the source program.

While helpful, cross-references require a lot of paper shuffling by the user. They also quickly become out of date as the program is modified.

Today, most programmers use text editor software to develop and maintain source code. Most text editors have a search function which helps the user look up names. By typing in a name, the user can find all the places in the program where the name occurs.

A text editor has several drawbacks when used to study programs. It requires a fair amount of typing. As the program gets larger, the editor takes longer to find a name. Often, it does not find what the user is looking for. For example, it may find a longer name that contains the characters that the user typed, or it may find a reference when the user was looking for a definition. In some programming languages, the same name can be re-used in many definitions; the context of a reference determines which definition it refers to. Text editors fail to distinguish between the various definitions of the same name. When the editor finally locates the correct information, the user is faced with the task of finding his way back to where he started. This is very difficult when one search triggers another, which triggers another, etc.

Whatever the merits of cross-references and text editors, they do not achieve the benefits of the present invention.

SUMMARY OF THE INVENTION

The object of the present invention is to enable the user to find his way around a source program with as little effort as possible. Specifically, the principal objects are:

- to enable the user to view the context of definitions and references without typing names or shuffling paper;
- to do so without perceptible delay;
- to find precisely the information requested; and
- to facilitate returning to the previous location after the desired information has been viewed.

These objects are achieved by the present invention, which is a computer program for viewing source code. In order to avoid confusion between the present invention and the source program being studied, the present invention will be referred to as the "viewer".

The viewer is preferably run on a personal computer or workstation. In order for the viewer to function efficiently, the computer hardware preferably includes a display screen capable of displaying approximately 80 columns by 24 lines of text, a keyboard, sufficient random access memory to contain the viewer object code plus the source program being viewed plus an internal cross-reference, and a mass storage device such as a diskette or hard disk drive for storing the necessary data. Virtually all personal computers and workstations currently on the market fulfill these requirements.

While the viewer will probably function best on a personal computer or workstation, it could also be adapted to a mainframe or minicomputer that may be shared by many users. The functions of the viewer, such as reading input from a keyboard and displaying and highlighting text on a display, can easily be implemented on virtually all computers. It is not intended that the scope of the invention be limited to any particular type of computer.

The viewer incorporates some knowledge of the syntax of the particular programming language being viewed. This is necessary so that user-defined names can be distinguished from reserved words and other syntactic elements, and definitions can be distinguished from references. If the language allows the same name to be re-used in multiple definitions, the viewer must be able to associate a reference with the correct definition.

In the preferred embodiment, the viewer is tailored to the COBOL language. However, those skilled in the art will recognize that the same principles are applicable to a wide variety of programming languages. It is not intended that the scope of the invention be limited to a single language.

When the viewer is started, it reads the source program into memory. Next it builds, in memory, a cross-reference of the user-defined names. This enables the viewer to find definitions and references rapidly and accurately.

When the user needs to look up the definition of a name that is displayed on the screen, he first highlights that name. In the preferred embodiment, this is done by holding a first key down until the viewer highlights the desired name. The viewer highlights only user-defined names, skipping over reserved words and other syntactic elements. When the desired name is highlighted, the user presses a second key. In response to the second key, the viewer looks up the definition of the name in its cross-reference, and displays the area of source code that contains the definition. By pressing a third key, the user can instead look up the next or previous reference to the highlighted name.

Every time the viewer looks up a definition or reference, it saves a record of the text location that was being displayed before the lookup. By pressing a fourth key, the user can immediately return to the previous location. The viewer saves multiple locations on a stack, so that the user can return from a series of successive lookups.

BRIEF DESCRIPTION OF THE DRAWINGS

FIG. 1 is a simplified drawing showing a computer on which the invention is running;

DESCRIPTION OF THE PREFERRED EMBODIMENT

Figure 2B:
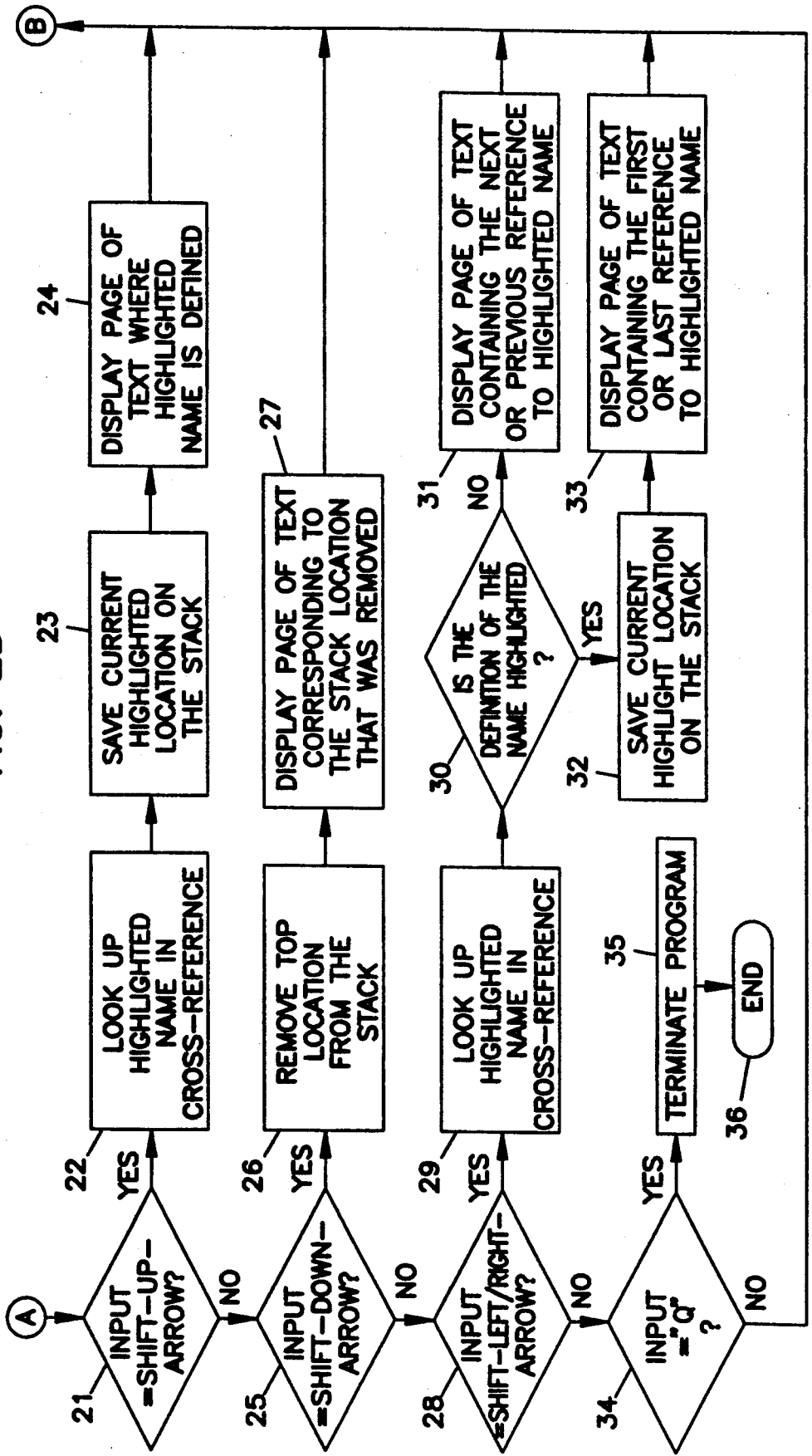
FIGS. 2A and B are an overall flow diagram of the invention, which is further detailed in FIGS. 3 through 6.

The present invention (the "viewer") is a computer program which runs on a computer preferably comprising the following hardware:
- sufficient random access memory to contain the viewer, the source program being viewed, and a cross-reference;
- a mass storage device such as a diskette or hard disk;
- a display screen capable of displaying approximately 80 columns by 24 lines of text and of highlighting portions of that text in some fashion;
- a keyboard or other means for entering information; and
- a means for selecting positions on the screen, such as cursor control (arrow) keys.

In the following description, the term "pointer" is often used. This refers to a variable which contains the memory address of some other variable, in accordance with common programming practice.

In the following description, the term "highlight" is often used. While the viewer is operating, the screen display usually consists of a page of text from the source program, plus a bottom line that is reserved for error messages or other information. One word in the text will usually be highlighted. The preferred method of highlighting is with reverse video. This can be done easily on most computers. The exact method of doing this varies from one brand of computer to another. Those skilled in the art will recognize that alternative methods of identifying words on the screen display could be used.

Refer now to FIG. 1, which illustrates an embodiment of the invention being run on a small computer. In this example a sample of COBOL source code is used. The source code resides in a disk drive shown at bottom left (1). At bottom right a page of program text appears on the display screen (2). The data name "EMP-NAME" is highlighted in reverse video. At the bottom of the screen a message informs the user that the highlighted reference to "EMP-NAME" is the first of two references to that name in the program. The upper part of the drawing (3) is a simplified representation of the data stored in the computer's memory by the viewer. On the right (4) the source program text is shown. On the left (5) is a cross-reference which contains all the user-defined names in the program. For each name there is one definition pointer and several reference pointers. These pointers point to all the places in the text where the name is used.

Refer now to FIGS 2A and B, which are an overall flow diagram of the preferred embodiment of the invention.

In Block 11 the user starts the viewer program. In the startup command, the user may specify the name of the source code file he wants to view; if this is omitted the viewer will ask for the name.

In Block 12 the viewer reads a list of reserved words from a mass storage device and stores them in random access memory. Any word in this list is considered by the viewer to be a fixed part of the programming language, and will not be stored in the cross-reference nor highlighted in the subsequent operation of the viewer. By storing this list in a separate file, rather than hardcoding it into the viewer, the user can customize the list. This is important since many programming languages are not rigidly standardized, and different dialects may include different reserved words. The reserved word list is stored in memory in the form of a hash table. The hashing technique is discussed in the description of Blocks 95 through 97 below.

In Block 13 the text of the source program which the user wants to view is read from a mass storage device and is stored in random access memory. The source code is stored one line at a time. It is assumed that lines of code can be distinguished in the input file, either by being terminated by a special character such as a newline, or by being of fixed length. Before storing each line, the viewer checks whether enough memory is available. If there is not enough, the viewer requests another block of memory from the operating system. In the preferred embodiment, if memory is exhausted, the viewer displays an error message and terminates. Pointers to the previous and next line are stored with each line. To conserve memory, leading and trailing spaces on each line are not stored; instead, the count of leading spaces is stored with each line. The text of each line is terminated with a null (zero) character.

When the source program has been read into memory, the viewer displays the first page of text (Block 14). Depending on the language, this may be the beginning of the text file, or some more convenient location such as the "main" procedure.

In Block 15 the viewer reads through the source program and constructs a cross-reference containing the locations of all the definitions and references in the source program. This process is described in detail below where FIGS. 3A and B, 7A, and 7B are explained When the cross-reference is completed, the viewer has completed its pre-processing and waits for input from the keyboard (Block 16). Blocks 17, 19, 21, 25, and 28 indicate that the arrow (cursor control) keys and shift key control most of the functions of the viewer. Those skilled in the art will recognize that any keys could have been chosen, but on most keyboards using the arrow keys and shift key makes it convenient to control the viewer with one hand. Since there are no standard ASCII codes for the arrow keys, it is necessary to read the keyboard scan codes. The precise method of doing this varies from one brand of computer to another.

When the user wants to page forward or backward in the text, Blocks 17 and 18 are executed. Block 17 tests whether the user has pressed the left or right arrow key. If so, the viewer displays the previous or next page of text respectively (Block 18). The viewer always maintains a pointer to the line of text that is at the top of the screen. To page forward or back, the viewer moves this pointer by following the "next" or "previous" line pointers which were stored when the program was read into memory. It then displays the lines of text on the screen, starting with the line pointed to by the top-of-screen pointer and following the "next line" pointers.

Figure 4:
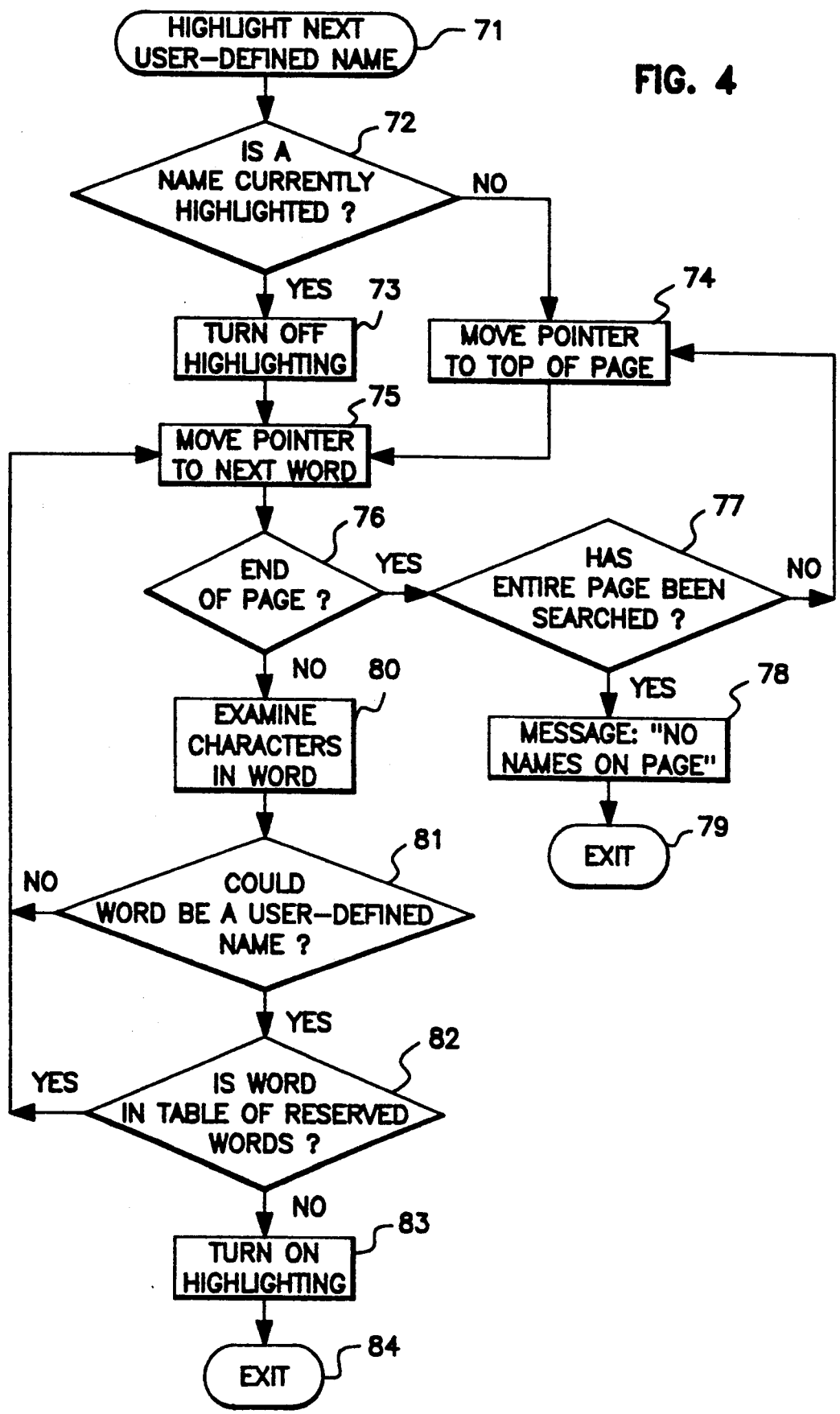
FIG. 4 is a flow diagram illustrating how the viewer advances highlighting from one word to the next.

Before looking up a definition or reference, the user must highlight the name. Block 19 tests whether the user has pressed the up or down arrow key. If so, the viewer moves the highlighting to the previous or next user-defined name (Block 20). This process is described in detail below where FIG. 4 is explained.

Blocks 21 through 24 are executed when the user looks up a definition. Block 21 tests whether the user has pressed the up arrow while holding the shift key down. This indicates that the user wants to look up the definition of the name that is highlighted. The viewer always maintains a pointer to the beginning of the name that is highlighted. It also maintains a pointer to the line that contains the highlighted name. When the user presses shift-up-arrow, the viewer first looks up that name in the cross-reference (Block 22). This process is detailed in FIGS. 5A and B, which is explained below.

After the viewer has found the cross-reference entry for the name, it saves the current highlight location on the "return stack" (Block 23). The return stack is a fixed-size array of pointers. Each entry in the stack contains a pointer to a name that has been highlighted at some time in the past, plus a pointer to the line containing the name. It also contains the length of the highlighted name and the vertical screen position of the name (first line=0, etc.) The viewer maintains a subscript that points to the top of the stack. This subscript is incremented when a new name is added. When the subscript reaches the limit of the array, it cycles back to zero. Therefore, the oldest return location is destroyed when the stack is full. The stack is large enough so that this limitation will seldom if ever be a problem for the user.

When the return location has been saved, the viewer displays the page of text where the highlighted name is defined (Block 24). This process is detailed in FIG. 6, which is explained below. Then the viewer returns to Block 16 and waits for the next keyboard input.

Blocks 25 through 27 are executed when the user wants to return to his previous location in the text, after looking up a definition or reference.

In Block 25 the viewer tests whether the user has pressed the down arrow while holding the shift key. This means that the user wants to return to the previous text location. The previous location is stored at the top of the return stack. In Block 26 the viewer removes the location pointers from the top of the stack and places them into its highlight pointers. The top stack entry is zeroed out and the stack subscript is decremented; when the subscript reaches zero it cycles back to the end of the return stack array. If the top of the stack contains zero before entering Block 26, the stack is empty. In this case the viewer displays an error message and waits for the next input.

In Block 27 the viewer displays the page of text containing the text location that was removed from the stack. The pointers and the line number from the stack are used to reconstruct the screen exactly as it appeared when the location was added to the stack. If the line number is zero, the highlighted name is on the top line of the screen. In this case the top-of-page pointer is copied from the line pointer from the stack. If the line number is greater than zero, the viewer follows the "previous line" pointers to establish the top-of-page pointer the correct number of lines above the highlighted name. It then writes the lines of text to the screen and turns on the highlighting. Because the highlighting is restored, the user can easily jump back and forth between the original screen and the definition screen, simply by holding down the shift key and pressing the up or down arrow.

Blocks 28 through 33 are executed when the user wants to display the first, last, next, or previous reference to a name. If the highlighting is resting on the definition of the name, the first or last reference will be displayed. If the highlighting is on a reference, the next or previous reference will be displayed.

In Block 28 the viewer tests whether the user has pressed the left or right arrow key while holding down the shift key. If the user presses the left arrow, he wants to see the previous or last reference; if he presses the right arrow, he wants to see the next or first reference. In Block 29 the viewer looks up the highlighted name in the cross-reference. This process is detailed in FIG. 5 which is explained below.

Block 30 decides whether the highlighting is resting on the definition of the name, or on a reference. This is explained below in the description of FIG. 6.

In Block 31, the highlight was resting on a reference so the viewer displays the next or previous reference to that name. This process is detailed in FIG. 6 which is explained below. In this case the viewer usually does not save the current highlight location on the return stack, since the user can return from a shift-left-arrow by pressing shift-right-arrow and vice versa. The exception to this rule occurs if the user has moved the highlight using the up or down arrow just before pressing shift-left/right-arrow. In this case, the viewer does save the return location. This allows the user to immediately return to the "original" reference that he was looking at, after looking through a series of references.

In Block 32, the highlight was resting on the definition so the viewer displays the first or last reference. First it saves the current highlight location on the stack, as was described above for Block 23. Then, in Block 33, it displays the page of text containing the first or last reference. This process is detailed in FIG. 6 which is explained below.

When the user is finished, he presses 'Q' to terminate the viewer (Block 34). There is no significant processing involved in terminating the viewer (Block 35), beyond closing files and freeing memory that has been allocated.

If the user presses an incorrect key, the viewer simply waits for another key to be pressed.

This concludes the description of FIGS. 2A and B, which outlines the overall functioning of the present invention. In the following text, certain portions of the invention are described in more detail.

Figure 3B:
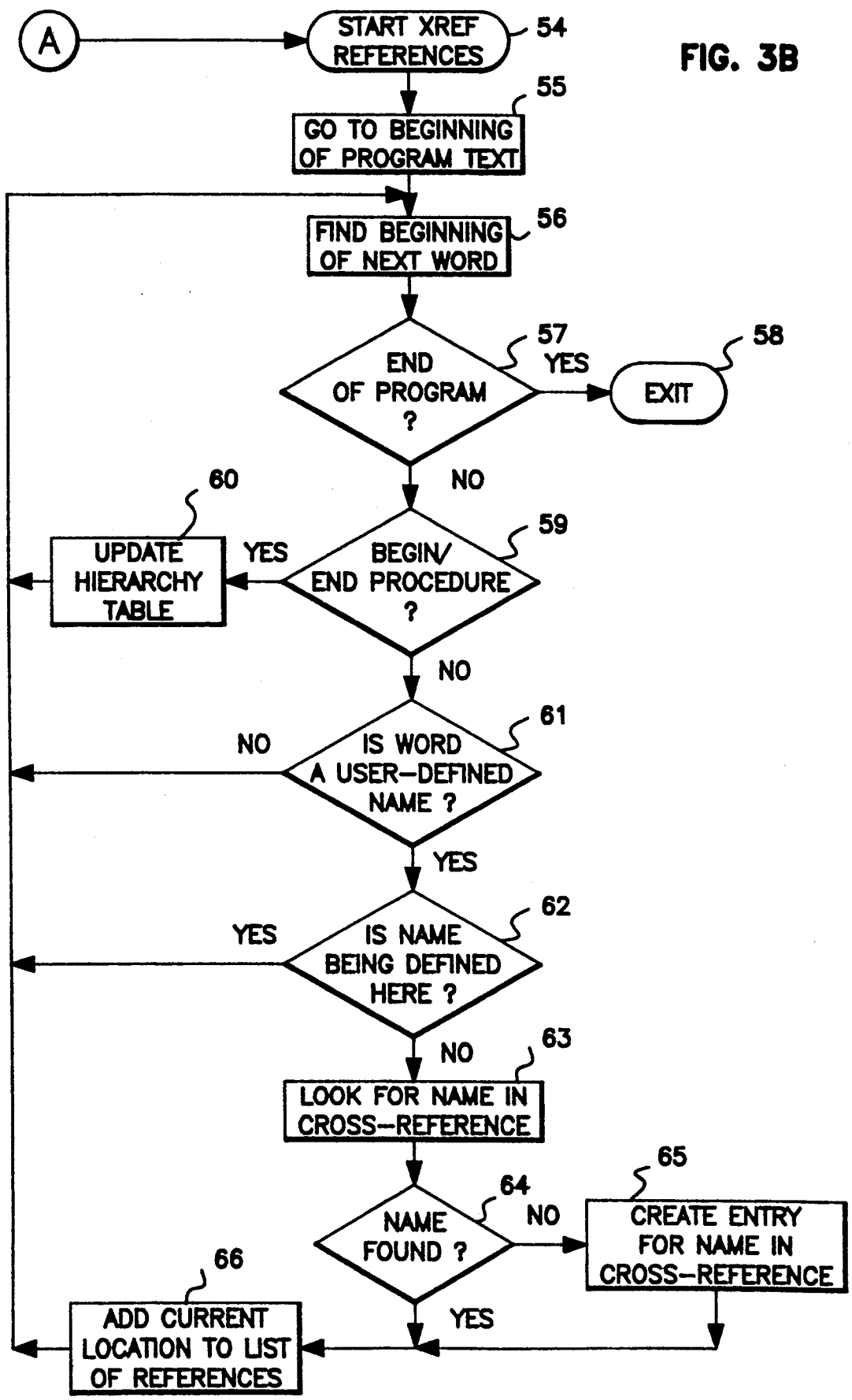
FIGS. 3A and B are flow diagrams illustrating how the internal cross-reference is built.
Figure 7A:
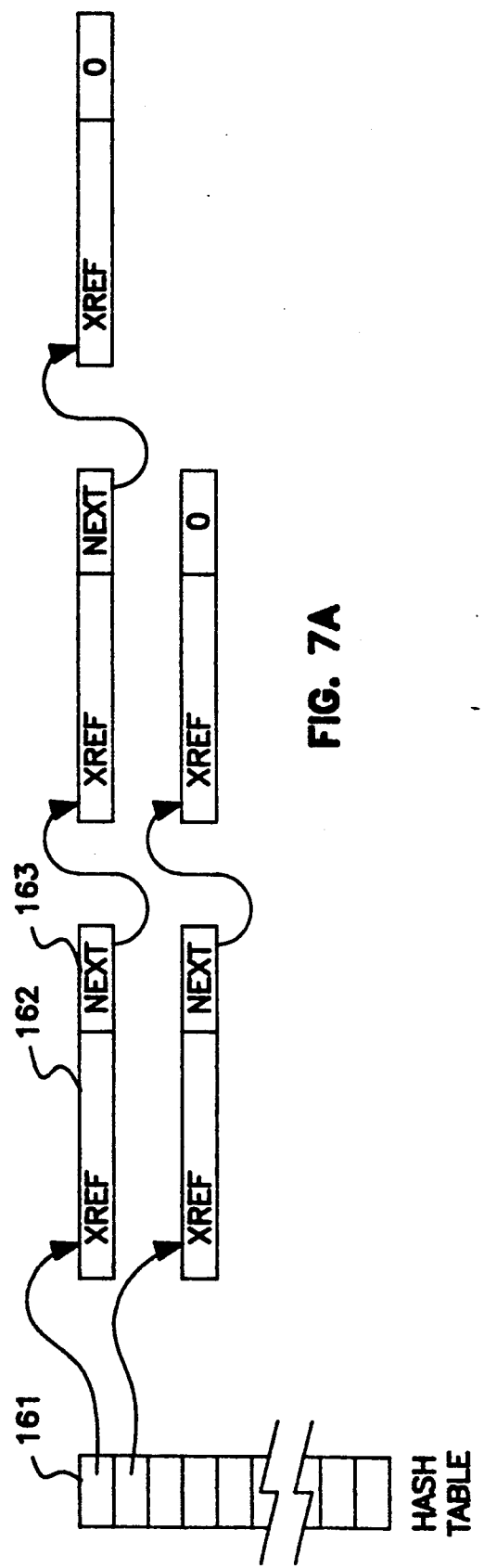
FIG. 7A illustrates the overall organization in memory of the cross-reference.
Figure 7B:
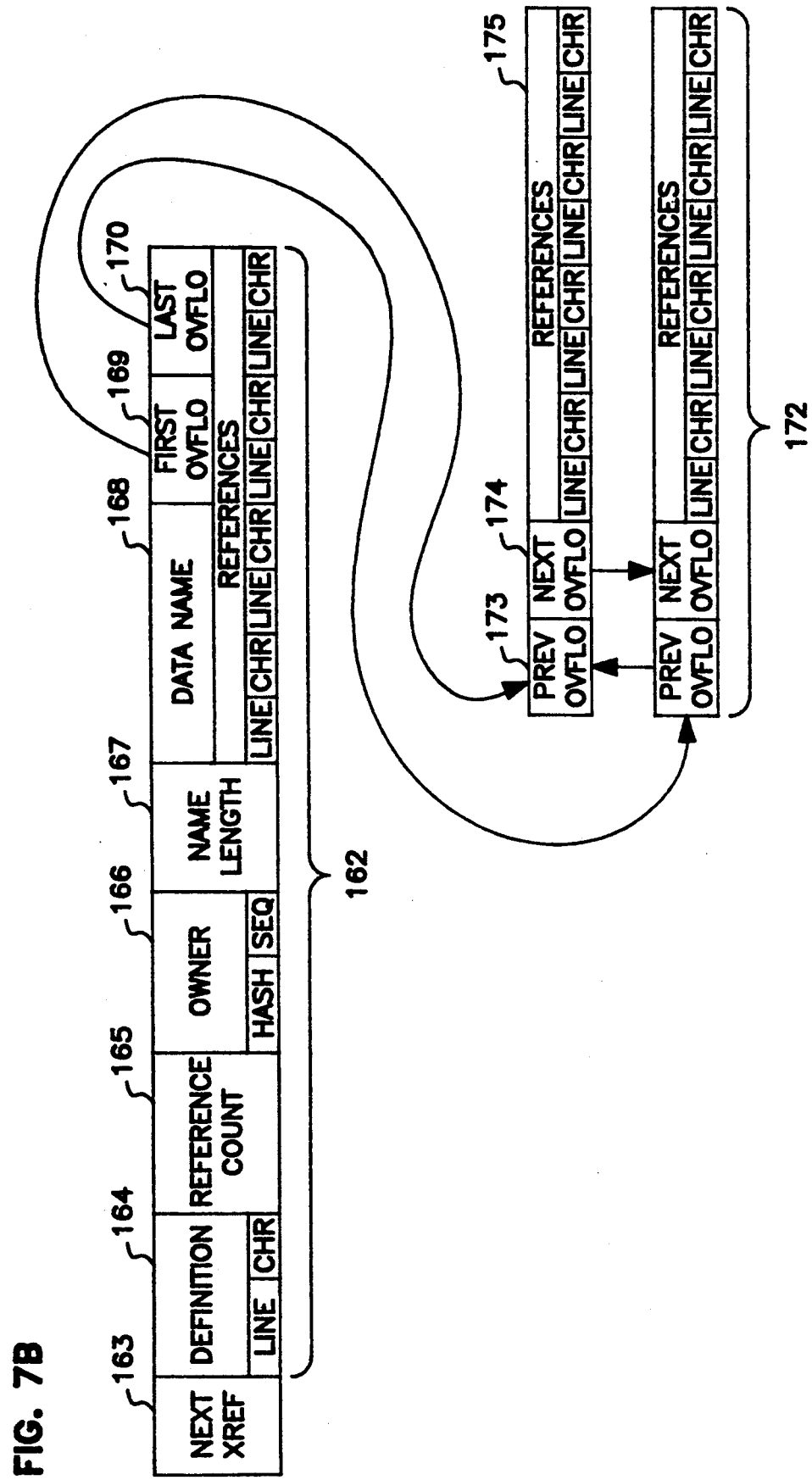
FIG. 7B is a detailed illustration of the memory organization of a single entry in the cross-reference.

Before proceeding to FIGS. 3A and B through 6A to C, it may be helpful to examine FIGS. 7A and 7B. These figures illustrate how the cross-reference is constructed in memory. The cross-reference was designed to combine rapid access with efficient use of memory.

FIG. 7A is an overall view of the cross-reference. The cross-reference consists of a hash table (161) and a large number of cross-reference entries (162). Each entry in the hash table is simply a pointer that points to the beginning of a chain of cross-reference entries. Each cross-reference entry contains a pointer (163) to the next entry in that chain. There is one cross-reference entry for each definition in the source program being viewed. To determine which chain a particular cross-reference entry belongs to, a hashing algorithm is applied to the user-defined name. This is explained below in the description of FIGS. 5A and B. The size of the hash table is determined after the source program has been read into memory. The size is a prime number that is proportional to the length of the program, so that the length of the chains of cross-reference entries is never excessive. Typically several names will have the same hash value.

FIG. 7B is an expanded view of a single cross-reference entry. In a typical program, many names have few if any references, while some names may have hundreds of references. To accommodate this variability, each cross reference entry has one "base" table (162) and may if necessary have any number of "overflow" tables (172). If overflow tables exist, the base table contains pointers to the first and last overflow table (169, 170). The overflow tables are chained together by pointers in both directions (173, 174).

The base table contains the following fields: a pointer to the next cross-reference entry in the hash table chain (163); a pointer to the line and character offset where the name is defined (164); a count of the references to the name (165); a hash value and sequence number which point to the owner of this name (see below) (166); the length of the name (167); the name itself (168); pointers to the first and last overflow tables (169, 170); and a variable number of reference pointers (171).

The owner hash and sequence numbers are only required if the language allows a name to be re-used in multiple definitions. When this is true, names generally must be defined in a hierarchy so that one definition may be "owned" by another. The owner hash and sequence numbers point to the cross-reference entry for the next definition "up" in the hierarchy. The hash number is that of the owner's cross-reference entry; the sequence number is its position in the chain of entries.

Each reference pointer consists of a line pointer and character offset. To conserve space, references may be stored in the end of the name field if the name is shorter than the maximum size. References may also be stored in the overflow pointer fields if there are no overflows. The viewer determines the format of these fields based on the name length and reference count fields.

The overflow tables contain pointers to the previous and next overflow (173, 174), and a fixed number of reference pointers (175).

Now refer to FIGS. 3A and B, which illustrates how the cross-reference is built. This diagram illustrates a two-pass process for building the cross-reference. In the first pass through the text, all definitions are stored; in the second pass, all references are stored. For some programming languages it may be possible to do both in a single pass; for others (COBOL for example), two passes are necessary to insure accuracy.

When the viewer is building the cross-reference, it maintains a pointer to the current word in the text. In Block 42 the pointer is moved to the beginning of the program. Also at this point the hash table is initialized. The size of the hash table is computed by dividing the character count of the source program by an appropriate constant. The result is rounded up to the nearest prime number. Then the viewer allocates and clears the necessary amount of memory for the hash table.

With the hash table initialized and the pointer at the beginning of the text, we enter the main loop for building the cross-reference. In block 43 the viewer finds the beginning of the next word. In most programming languages certain characters can be used to construct words, and other characters are used to separate words. So in general it is easy for the viewer to scan through the text and identify one word at a time, though the precise details will vary depending on the language.

Block 44 tests whether we have reached the end of the text. If so, the viewer starts the second pass through the text.

In Block 45 the viewer looks for a hierarchy indicator. In languages where the same name can be re-used for multiple definitions, the viewer must distinguish these definitions by recording the hierarchy of definitions within which the current name is being defined. Each language has its own way of defining hierarchies. For example, in COBOL, the hierarchy of data names is defined by "level numbers". Many other languages use punctuation characters such as parentheses or braces. As it is building the cross-reference, the viewer maintains a table of pointers to the cross-reference entries for the current hierarchy of definitions. When the viewer finds a hierarchy indicator, it adjusts the index into this table (Block 46).

In Block 47 the viewer tests whether the pointer is pointing at a user-defined name. Again, the details of this vary from one language to another. In general, this is a two-step process. First the viewer examines the characters in the word to determine whether the word is in the correct format for a name (as opposed to a numeric literal, for example). If so, it checks whether the word is in the table of reserved words. If the word is not in this table, it must be a user-defined name; if the word is in the table or is not in the correct format, the viewer ignores it and continues on to the next word.

When the viewer has found a user-defined name, it must determine whether the name is being defined here (Block 48). Once again, the details of this vary from one language to another. In many languages a definition is preceded by certain reserved words (such as INTEGER, STRING, PROCEDURE, etc.) In COBOL a data definition is preceded by a "level number" or certain reserved words in the Data Division; a paragraph definition is a non-reserved word starting in columns 8-11 in the Procedure Division. In general it is easy for the viewer to recognize the context of a definition. If the name is not being defined here, the viewer continues on to the next word.

When cross-referencing a definition, the viewer first attempts to look it up in the cross-reference (Block 49). The details of this are described in FIGS. 5A and B and explained below. If a definition of the same name is found (Block 50), and the name is not in a different hierarchy of definitions, a syntax error message is displayed (Block 53).

Assuming that no syntax error has been found, in Block 51 the viewer creates a new cross-reference entry for the definition. The first step is to obtain some memory. If memory is exhausted, an error message is displayed and the viewer terminates. Next, a cross-reference base record is created as shown in FIG. 7B. The current line pointer and character offset are placed into the "definition" field. The new entry is linked to the end of the chain (FIG. 7A), or is linked directly to the hash table if there is no chain. The hash table entry and chain are the same ones that were found in Block 49.

If the viewer is keeping track of hierarchies, it updates the hierarchy table (Block 52). This is the table that was referred to in the description of Block 46. The viewer stores in this table the hash value and chain position of the cross-reference entry that was just created. It also updates the "owner" hash and sequence fields in the new cross-reference entry. These fields receive the location of the cross-reference entry for the next definition "up" in the hierarchy from the current definition.

When the new cross-reference entry has been created, the viewer continues on to the next word in the text (Block 43).

Blocks 54 through 66 are the second pass through the text, where references rather than definitions are added to the cross-reference. The processing in Blocks 54 through 63 is nearly identical to Blocks 41 through 49. In Block 62 the decision is simply the reverse of that in Block 48, since here we are looking for references instead of definitions. Blocks 59 and 60 are needed if the language allows local variables, in other words names whose definitions are valid only within one procedure or block of code. In this case, Block 59 tests whether we are entering or leaving a procedure. If so, Block 60 updates a hierarchy table. This table is similar to the one mentioned in Blocks 46 and 52. It enables the viewer to find the correct cross-reference entry if there are duplicate names.

In Block 64, if no definition is found in the cross-reference, this would seem to imply a syntax error in the source program, since a name that is not defined cannot be referenced. However, by allowing undefined references the viewer can handle incomplete programs and programs where certain variables are defined outside of the source file (for example, in a database management system). So, in Block 65, the viewer creates a cross-reference entry much as it does in Block 51, except that the definition field is empty.

In Block 66 the current location in the text file is added to the list of references in the cross-reference entry. If necessary, an overflow table is added and linked to the base or previous overflow table. The reference count in the cross-reference base record is incremented.

Refer now to FIG. 4, which details how the highlighting is advanced from one user-defined name to the next. In this process, when the highlighting reaches the bottom of the screen it wraps around to the top. The process for moving the highlight to the previous name is very similar and will not be described separately.

The first step is to test whether a name is currently highlighted (Block 72). Usually there will be a highlighted name on the screen, but the highlighted name will scroll off the screen when the user presses the left or right arrow to page forward or back. As mentioned previously, the viewer always maintains a pointer to the highlighted name. It also maintains a variable containing the vertical position on the screen of the highlighted name. When the user pages forward or back, the highlight pointer does not change but the screen position variable will be incremented or decremented by the number of lines on the screen. If the screen position variable is outside the bounds of the screen size, there is no highlighted name on the screen.

If there is a highlighted name, the viewer turns off the highlighting (Block 73). If there is no highlighted name, the pointer that keeps track of the highlighted name is moved to the end of the line of text preceding the top line on the screen (Block 74).

In Block 75 the pointer is moved to the beginning of the next word in the text. The details of how this is done may vary depending on the programming language being viewed. In general, the pointer is advanced until a separator character is found (a character that is used to separate words). Then the pointer is advanced until a word-forming character is found. When end-of-line is reached, the viewer follows the "next line" pointer and increments the screen position variable.

If the screen position variable exceeds the number of lines per screen, we are at the end of the screen (Block 76). If so, the viewer tests whether the entire screen has been searched (Block 77), in other words, whether the search started at the top of the screen. If so, there are no words on the screen that can be highlighted, so an error message is displayed (Block 78). Otherwise, the viewer returns to Block 74 and starts searching at the top of the screen.

If the viewer finds a word before the end of the screen, it examines the word to determine whether it is in the correct format for a user-defined name (Block 80). If not, the viewer returns to Block 75 and advances to the next word. If the format is correct, the viewer tries to find the name in the table of reserved words (Block 82). If the word is found, the viewer returns to Block 75. If the word is not found, it is a user-defined name and is highlighted (Block 83).

Figure 5A:
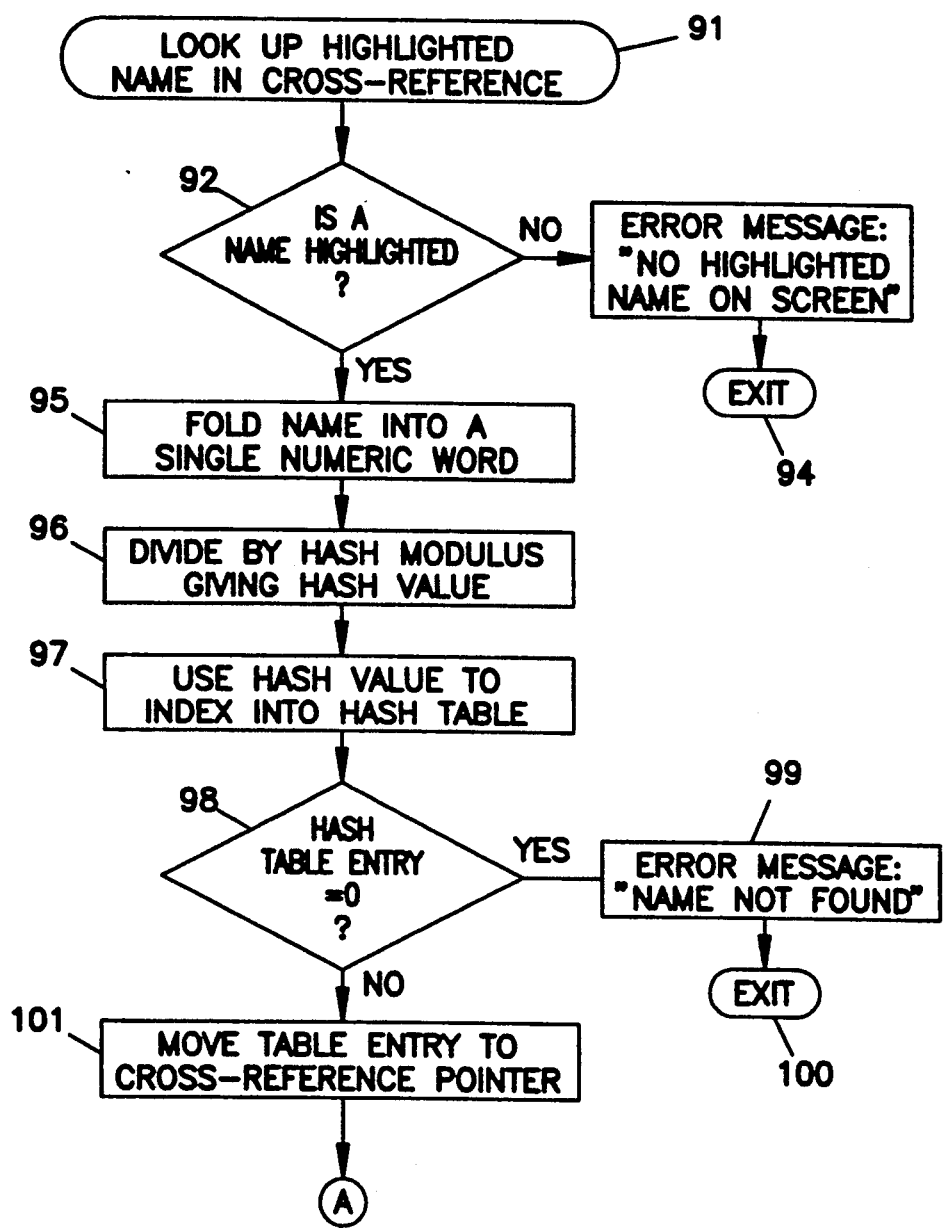
FIGS. 5A and B are flow diagram illustrating how the viewer looks up a highlighted name in the cross-reference.
Figure 5B:
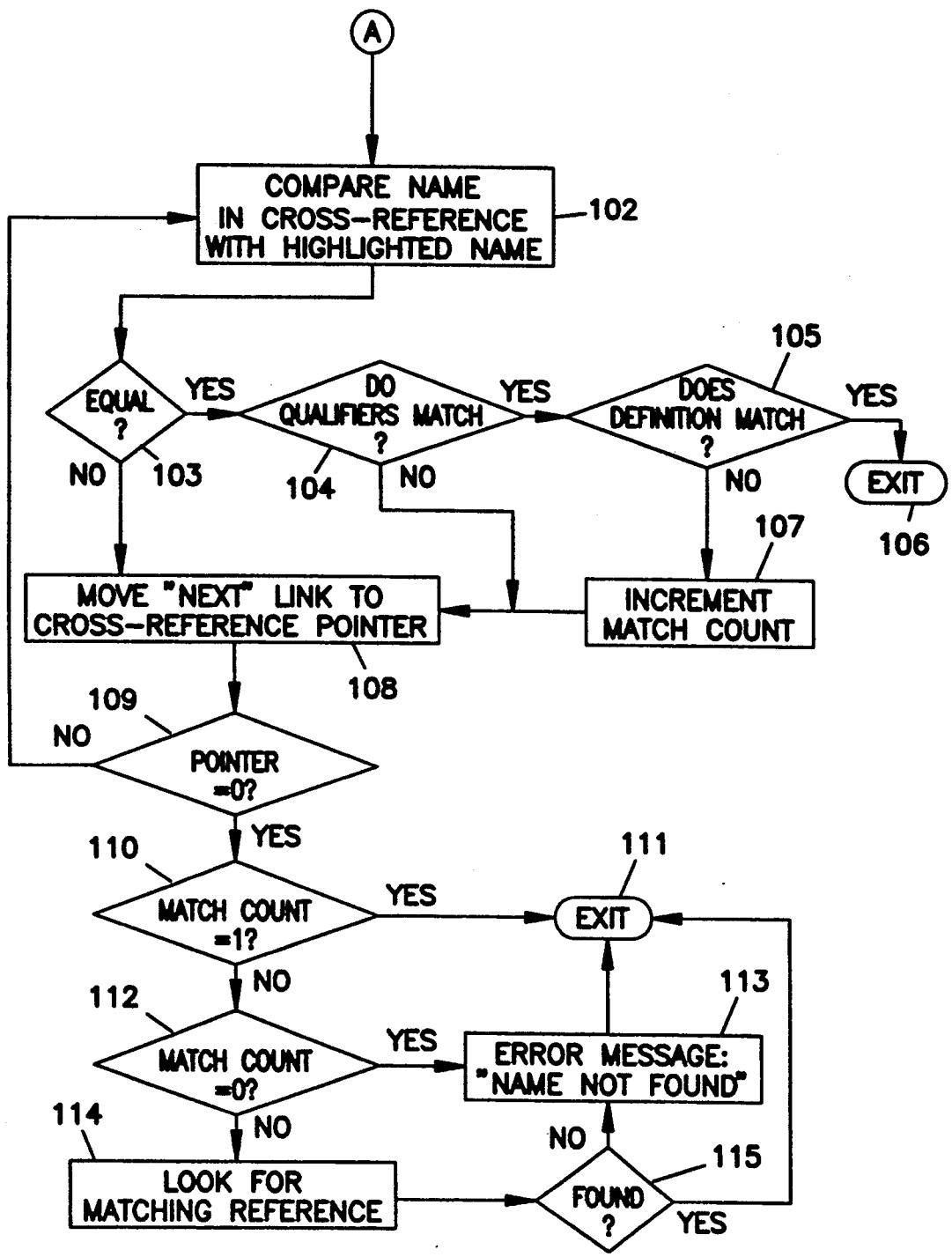

Refer now to FIGS. 5A and B, which detail's how the viewer looks up a highlighted name in the cross-reference. Block 92 examines the screen position variable to see whether there is a highlighted name on the screen; if not, an error message is displayed (Block 93).

If there is a highlighted name, the viewer looks up the cross-reference entry for that name. To do this, it first decides which chain of entries is the correct one; then it searches down that chain until it finds the entry.

The viewer finds the correct chain by computing a hash value which is used to access the hash table of the cross-reference. The hash value is computed by first "folding" the name into a single numeric word (Block 95).

The size of this word equals the size of the computer's arithmetic, typically 16 or 32 bits. The folding is done by applying a logical exclusive-OR operator to all the characters of the name. For example, in the case of 32-bit arithmetic, the first four characters of the name are OR-ed with the next four, then the result is OR-ed with the next four, and so on until the end of the name is reached. The resulting numeric value is divided by the hash modulus (Block 96) and used to index into the hash table (Block 97).

The viewer then examines the hash table entry (Block 98); if it is zero, the name was not found in the cross-reference and an error message is displayed (Block 99).

If the hash entry is not zero, we have found the beginning of the chain that must contain the entry we are looking for. If the language allows duplicate names, there may be several entries in the chain that match our name. If so, it may be necessary for the viewer to search the chain twice, as explained below.

The viewer always maintains a pointer to the cross-reference entry that was most recently looked up. In Block 101 the hash table entry is moved to the cross-reference pointer. The count of matching names is initialized to zero. In Block 102 the name in the cross-reference entry is compared with the highlighted name; if they are different, the viewer looks for the next entry in the chain (Block 108). If the name matches, the viewer may have to check for qualifiers, depending on the language. For example, in COBOL a name may be qualified by one or more group names that contain it ("X OF Y"). If the viewer finds qualifiers adjacent to the highlighted name, it compares them with the "owner" names in the cross-reference (Block 104). If the qualifiers do not match, the viewer continues on to the next entry in the chain (Block 108). If they match, or if there are no qualifiers, the viewer compares the highlight pointer with the definition pointer in the cross-reference entry (Block 105). If these are equal, we have found the correct entry and the process exits (Block 106). Otherwise, the viewer saves a copy of the cross-reference pointer, increments the count of matching names (Block 107) and continues to the next entry in the chain.

In Block 108 the viewer moves the "next" link in the cross-reference entry to the cross-reference pointer; if this is zero the viewer has reached the end of the chain and continues to Block 110. If the "next" link is not zero, the viewer returns to Block 102 and continues searching down the chain.

When the viewer reaches Block 110 it has examined all the cross-reference entries that could possibly match the highlighted name. Ideally, the count of matching names equals one; if so, the cross-reference pointer that was saved in Block 107 is the correct one, and the process exits. If the match count is zero, an error code is returned (Block 113).

If the match count is greater than one, there are duplicate names and insufficient qualification. The viewer will try to determine which cross-reference entry is the correct one by searching through all the references (Block 114). It searches a second time through the chain of cross-reference entries, repeating most of the process of Blocks 101 through 109. This time, each time it finds a match on the name and qualification, it compares all the references in the base and overflow tables (if any) with the highlight pointer. If it finds a match, the process exits. If there is no match, an error code is returned (Block 113).

Figure 6B:
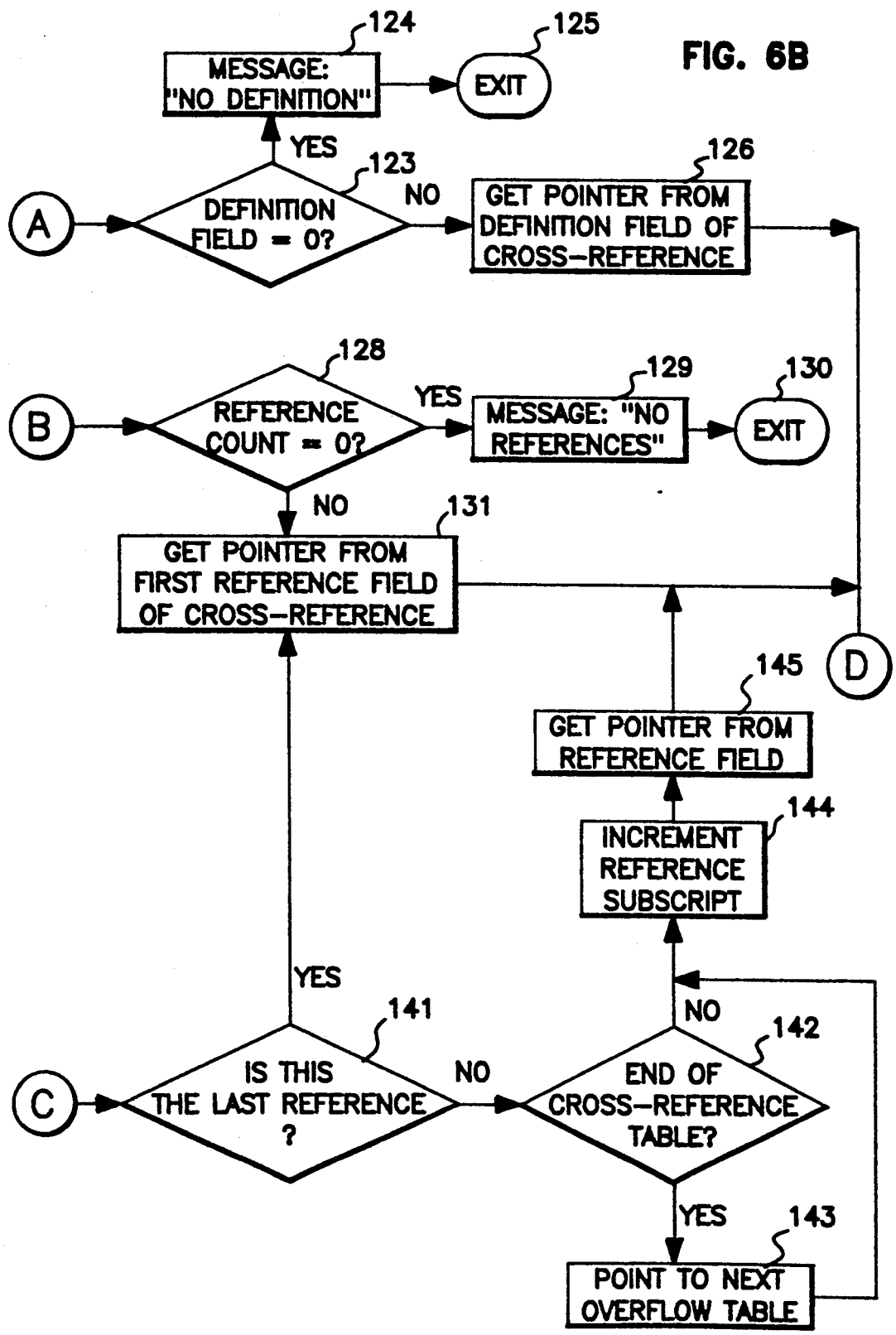
FIG. 6A, B and C are flow diagrams illustrating how the viewer displays the context of a definition or reference after it has been found in the cross-reference.
Figure 6C:
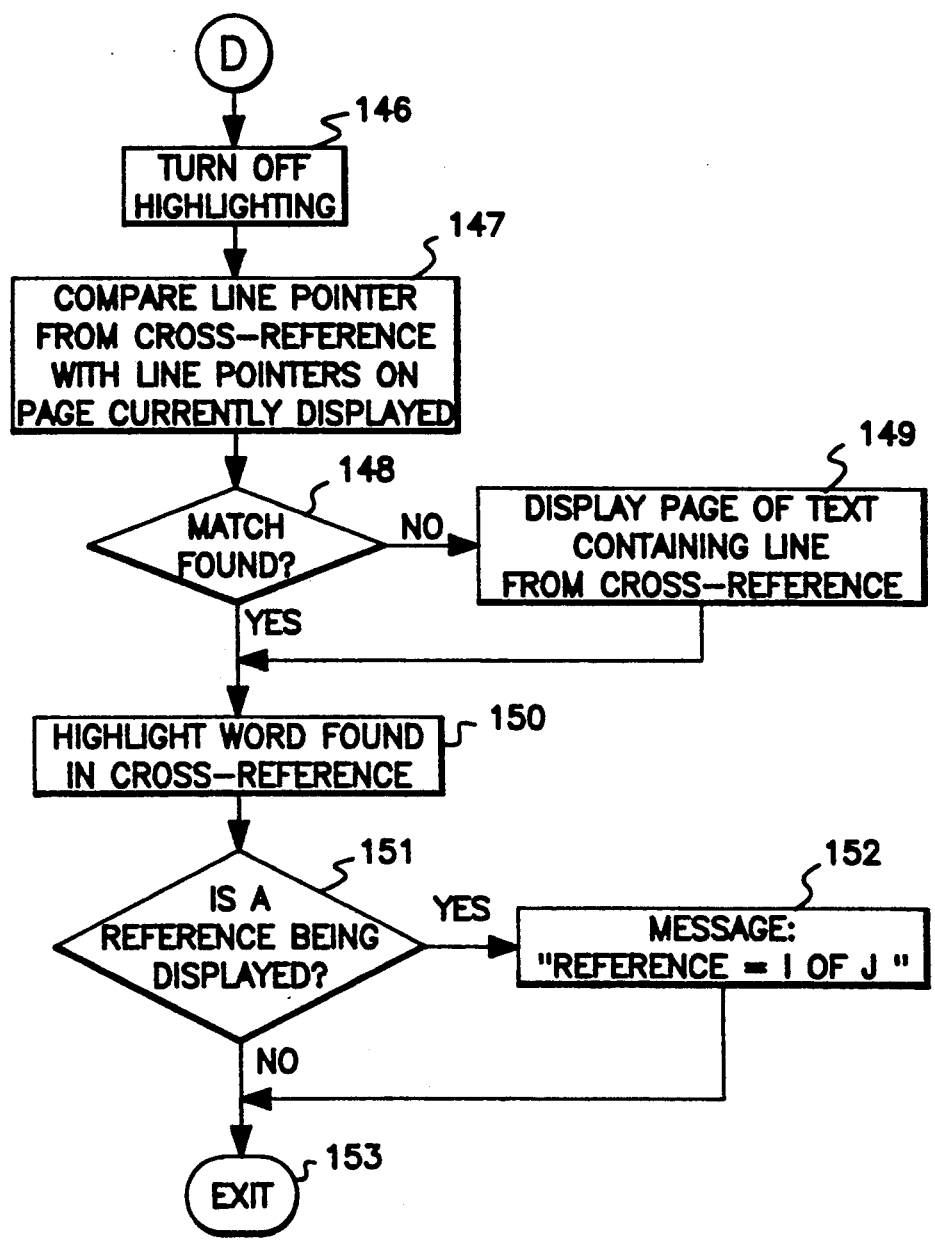

Refer now to FIGS. 6A to C, which detail how the viewer displays the page of text where a name is defined or referenced, after it has found the name's cross-reference entry. This diagram can be broken into four areas. Blocks 122 through 126 are performed when the user looks up a definition. Blocks 127 through 131 are performed when the user looks up the first reference. Blocks 132 through 145 are performed when the user looks up the next reference. Following all three of these cases, Blocks 146 through 153 are performed.

Block 122 tests whether the user has requested a definition by pressing shift-up-arrow. If so, Block 123 tests whether the definition field in the cross-reference entry is empty. This means that the highlighted name is never defined, which should never happen in a complete and syntactically correct program. If the definition is missing, an error message is displayed (Block 124). If the definition exists, the line pointer and character offset in the definition field are loaded into the highlight pointer and the page containing the definition is displayed (Blocks 146 through 153).

At Block 127 the user has pressed shift-right-arrow. If the highlight is resting on a definition of a name, the user wants to see the first reference; if it is resting on a reference, he wants to see the next reference. Block 127 compares the highlight pointer with the pointer in the definition field of the cross-reference entry. If they are equal, the first reference will be displayed; otherwise the next reference will be displayed.

If the first reference needs to be displayed, the viewer first checks the count of references in the cross-reference entry (Block 128). If it is zero, an error message is displayed. Otherwise, the line pointer and character offset from the first reference field in the cross-reference are loaded into the highlight pointer (Block 131) and the page containing the first reference is displayed (Blocks 146 through 153).

If the next reference needs to be displayed, the viewer must first find the current reference in the cross-reference entry. Blocks 132 through 140 detail how this is done. In Block 132 a subscript is set to point to the first reference in the cross-reference entry. Block 133 starts a loop comparing the subscripted reference with the highlight pointer. The subscript is incremented until the correct reference is found. If necessary, the overflow tables are searched (Block 139). If no matching reference is found, an error message is displayed (Block 136).

When the current reference is found, Block 141 tests whether this is the last reference. When the user is already looking at the last reference and requests the next reference, the viewer cycles back to show him the first reference (Block 131). Otherwise, the viewer increments the reference subscript (Block 144), if necessary jumping into the first or next overflow table (Block 143). The line pointer and character offset from the reference entry are loaded into the highlight pointer (Block 145) and the page containing the next reference is displayed (Blocks 146 through 153).

Now the viewer has found the text location that the user wants to see. This location may or may not be on the page that the user is already looking at. First the viewer turns off the highlighting (Block 146). Then it compares the line pointer that it found in the cross-reference with the pointers of the lines already being displayed (Block 147). If one of them matches, there is no need to re-draw the screen. If there is no match, the viewer displays a new screen starting with the line pointer from the cross-reference and using the "previous" and "next" line pointers to display the context of that line (Block 149). When the correct page is displayed, the word whose location was found in the cross-reference is highlighted (Block 150). Finally, if a reference is being displayed, the viewer displays a message on the bottom line which tells the user the ordinal number of this reference and the total number of references to this name (Block 152).

This concludes the description of the preferred embodiment of the invention. The following paragraphs describe some alternative methods of accomplishing the same objects.

A pointing device such as a mouse, touch-screen, or light pen could be used to point to the name that needs to be looked up. While this might be quicker than the method described, many computers are not equipped with a pointing device. A simple point-and-click does not tell the viewer whether to look up the definition, the previous reference, or the next reference. Moving back and forth between a pointing device and the keyboard is inconvenient.

Instead of storing the entire source program in random access memory, the viewer could access the secondary storage medium (e.g. disk) each time it needed to display a page of text. This would allow larger source programs to be viewed, but would degrade response time. It is believed that most source programs are small enough to fit into the memory of most computers today, and this is more likely to be true in the future.

The cross-reference could be omitted. If this were done, the viewer would function more like a typical text editor program, searching through the text whenever the user needed to look up a name. With every lookup the viewer would analyze the syntax to distinguish between definitions, references, and other language elements. This would reduce memory usage and eliminate the delay at startup while building the cross-reference. However, it would introduce a delay every time the user requested a lookup.

In summary, a viewer program has been described which enables a user to easily find his way around any source program, no matter how large and complex, given a computer with adequate memory. The viewer incorporates knowledge of the syntax of the source language and builds an internal cross-reference. Because of these features, the viewer can look up definitions and references instantaneously and precisely. The viewer's return stack relieves the user of the burden of remembering his previous location in the text. The method of highlighting relieves him of the burden of typing. These features together make it easier to understand a large, complicated program.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a computer having a memory, a display screen, a means for entering information, and a means for selecting positions on said screen, containing in said memory a text of a computer source program, said program containing definitions of and references to names, a method of finding and displaying said definitions and references, said method comprising the steps of:

(a) constructing in said memory a cross-reference containing locations of said definitions and references;
(b) displaying on said computer's display screen a page of text from said source program;
(c) highlighting a name within said page of text in response to selection of that name by a user using said means for selecting positions;
(d) locating an entry in said cross-reference that contains information about said highlighted name, in response to input from said user by said means for selecting positions;
(e) displaying a page of text containing the definition of or a reference to said highlighted name, depending on input from said user by said means for selecting positions;
(f) highlighting said definition or reference;
(g) saving on a return stack a location in said computer source program of said highlighted name of step (d);
(h) displaying a page of text containing a location that was previously saved on said return stack, in response to input from said user; and
(i) removing said location from said return stack.

2. An apparatus for finding and displaying definitions of and references to names defined in a computer source program, comprising:

(a) a computer having a memory, a display screen, a means for entering information, and a means for selecting positions on said screen, said memory containing said computer source program;
(b) means, executed by said computer, for constructing in said memory a cross-reference containing locations of said definitions and references;
(c) means, executed by said computer, for displaying on said computer's display screen a page of text from said computer source program;
(d) means, executed by said computer, for highlighting a name within said page of text in response to selection of that name by a user using said means for selecting positions;
(e) means, executed by said computer, for locating an entry in said cross-reference that contains information about said highlighted name in response to input from said user by said means for selecting positions;
(f) means, executed by said computer, for displaying a page of text containing the definition of or a reference to said highlighted name, depending on input from said user by said means for selecting positions;
(g) means, executed by said computer, for highlighting said definition or reference;
(h) means for saving on a return stack a location in said computer source program of said highlighted name;
(i) means for displaying a page of text containing a location in said computer source program that was previously saved on said return stack, in response to input from said user; and
(j) means for removing said location from said return stack.

* * * * *